(12) United States Patent
Seger et al.

(10) Patent No.: US 10,186,816 B2
(45) Date of Patent: Jan. 22, 2019

(54) SUSPENDED CEILING MOUNTING BRACKET FOR CONNECTOR INSTALLATION

(71) Applicant: Leviton Manufacturing Co., Inc., Melville, NY (US)

(72) Inventors: John L. Seger, Brier, WA (US); Bryan Hudgens, Bothell, WA (US); Mark E. Dearing, Bothell, WA (US); Ronald E. Shackelford, Snohomish, WA (US); Brian Hansen, Rosemount, MN (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 15/706,635

(22) Filed: Sep. 15, 2017

(65) Prior Publication Data
US 2018/0006410 A1    Jan. 4, 2018

Related U.S. Application Data

(63) Continuation of application No. 15/159,747, filed on May 19, 2016, now Pat. No. 9,793,659.
(Continued)

(51) Int. Cl.
*H01R 13/60* (2006.01)
*H01R 13/73* (2006.01)
(Continued)

(52) U.S. Cl.
CPC ........... *H01R 13/73* (2013.01); *H01R 13/518* (2013.01); *H02G 3/20* (2013.01)

(58) Field of Classification Search
CPC .... H01R 13/73; H01R 25/006; H01R 13/518; F21S 4/001; H02G 3/20; A47B 21/06; A47B 2021/066
(Continued)

(56) References Cited

U.S. PATENT DOCUMENTS

| 690,479 | A | * | 1/1902 | Storm | ...................... H02G 3/18 174/53 |
| 1,672,683 | A | * | 6/1928 | Knoderer | ................. H02G 3/18 220/3.7 |

(Continued)

OTHER PUBLICATIONS

Non-Final Office Action from U.S. Appl. No. 15/159,747, dated Feb. 7, 2017, 16 pages.
(Continued)

*Primary Examiner* — Abdullah Riyami
*Assistant Examiner* — Vladimir Imas
(74) *Attorney, Agent, or Firm* — Amin, Turocy & Watson, LLP

(57) ABSTRACT

A bracket and associated components provides a means to securely install one or more connectors within a dropped ceiling. The bracket can be mounted to a drop wire or threaded rod within a ceiling space, thereby suspending the bracket and associated connectors within the ceiling space. One or more connectors coupled to a cable can be directly installed on the bracket via port windows cut into the bracket. Alternatively, a surface mount box containing connectors can be mounted on the bracket to yield a protected, strain-resistant connector installation within the ceiling space. The bracket and associated components can be made of plenum-rated materials, making the mounting solution suitable for installations within plenum spaces.

20 Claims, 22 Drawing Sheets

Related U.S. Application Data

(60) Provisional application No. 62/211,588, filed on Aug. 28, 2015.

(51) Int. Cl.
*H01R 13/518* (2006.01)
*H02G 3/20* (2006.01)

(58) Field of Classification Search
USPC .......................... 439/574, 536, 538; 174/66
See application file for complete search history.

(56) References Cited

U.S. PATENT DOCUMENTS

| | | | | |
|---|---|---|---|---|
| 1,839,250 A * | 1/1932 | Newman | ............... | H02G 3/20 174/57 |
| 1,888,847 A * | 11/1932 | Carlson | ............... | H02B 1/044 174/58 |
| 2,013,142 A * | 9/1935 | Gaynor | ............... | H01R 25/006 174/53 |
| 2,167,419 A * | 7/1939 | Heanes | ............... | G01R 11/04 220/3.8 |
| 3,064,224 A * | 11/1962 | Wiley | ............... | H01R 13/652 439/107 |
| 3,917,899 A * | 11/1975 | Oliver | ............... | H01R 13/648 174/57 |
| 4,273,957 A * | 6/1981 | Kolling, Jr. | ............... | H04M 1/0293 174/53 |
| 4,403,106 A * | 9/1983 | Lask | ............... | H02G 15/117 174/59 |
| 4,449,015 A * | 5/1984 | Hotchkiss | ............... | H02G 3/10 174/138 F |
| 4,723,919 A * | 2/1988 | Crane | ............... | H01R 13/5213 439/521 |
| 4,731,501 A * | 3/1988 | Clark | ............... | H02G 15/013 174/153 G |
| 4,794,207 A * | 12/1988 | Norberg | ............... | H02G 3/125 174/505 |
| 4,910,770 A * | 3/1990 | Collins | ............... | H04Q 1/028 361/657 |
| 5,337,211 A * | 8/1994 | Reiner | ............... | H02B 1/056 361/637 |
| 5,835,981 A * | 11/1998 | Smith | ............... | H02G 15/117 174/82 |
| 6,051,785 A * | 4/2000 | Baldwin | ............... | H01H 23/04 174/54 |
| 6,358,086 B1 * | 3/2002 | Gallagher | ............... | H01R 13/518 439/538 |
| 6,838,997 B1 * | 1/2005 | Davidson | ............... | G08B 7/062 174/53 |
| 6,979,212 B1 * | 12/2005 | Gorman | ............... | H01R 13/4538 174/66 |
| 7,048,575 B2 * | 5/2006 | Kidman | ............... | H02G 3/16 174/53 |
| 7,241,031 B2 * | 7/2007 | Sloan | ............... | G09F 13/0404 362/240 |
| 7,435,905 B1 * | 10/2008 | Elder | ............... | H02G 3/081 174/92 |
| 7,482,537 B1 * | 1/2009 | Shotey | ............... | H02G 3/14 174/66 |
| 7,734,038 B2 * | 6/2010 | Martich | ............... | H01R 13/73 174/50 |
| 7,817,398 B1 * | 10/2010 | Maples | ............... | H04Q 1/146 361/111 |
| 7,994,516 B2 * | 8/2011 | Chan | ............... | F21V 15/01 257/81 |
| 8,269,101 B2 * | 9/2012 | Kane | ............... | H01R 9/0506 174/50 |
| 8,920,191 B2 * | 12/2014 | Carpanzano | ............... | H01R 13/74 439/491 |
| 8,938,919 B2 * | 1/2015 | Cinnamon | ............... | H02S 40/36 136/244 |
| 9,124,021 B2 * | 9/2015 | Kashiwada | ............... | H01R 13/512 |
| 9,368,924 B2 * | 6/2016 | Byrne | ............... | H01R 13/73 |
| 9,455,537 B2 * | 9/2016 | Scholeno | ............... | H01R 13/6595 |

OTHER PUBLICATIONS

Final Office Action from U.S. Appl. No. 15/159,747, dated May 4, 2017, 13 pages.

\* cited by examiner

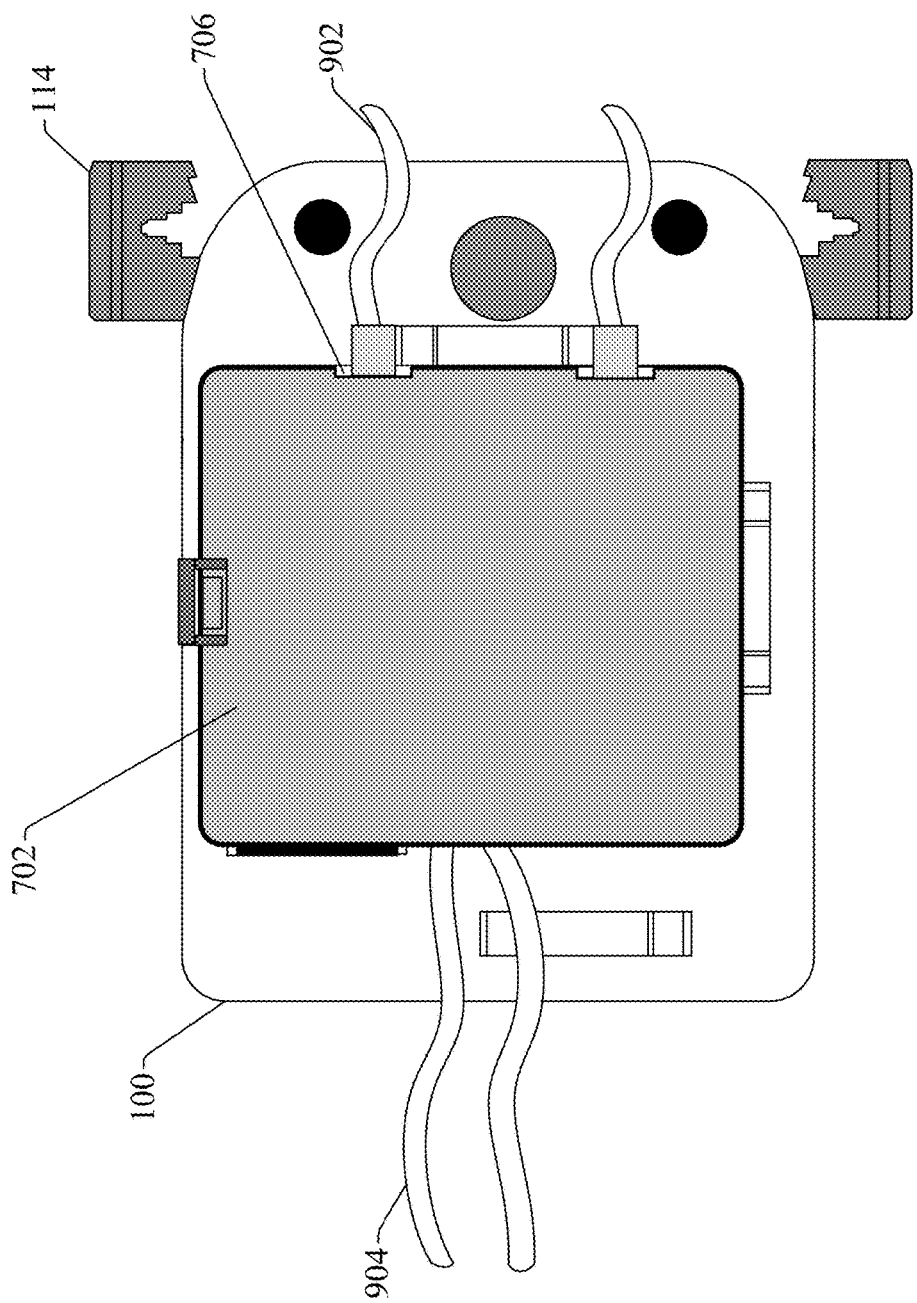

SUSPENDED CEILING MOUNTING BRACKET FOR CONNECTOR INSTALLATION

CROSS-REFERENCE TO RELATED APPLICATIONS

This application is a continuation of, and claims priority to each of, U.S. patent application Ser. No. 15/159,747, filed on May 19, 2016, and entitled "SUSPENDED CEILING MOUNTING BRACKET FOR CONNECTOR INSTALLATION," which claims priority to U.S. Provisional Patent Application Ser. No. 62/211,588, filed on Aug. 28, 2015. The entireties of these related applications are hereby incorporated herein by reference.

TECHNICAL FIELD

The disclosed subject matter relates generally to network cabling, and, for example, to a bracket or bracket assembly that can be used to securely install connectors within a ceiling space.

BACKGROUND

To provide data connectivity between the many computing, communication, or media devices distributed throughout commercial, campus, and residential buildings, network installers often run data cables within the walls, floors, and/or ceilings of the building. In many cases, this requires running the data cables through plenum spaces in the ceiling or floor of the building. Plenums are enclosed spaces within the building structure that conduct heated or cooled air throughout the building as part of a heating, ventilating, and air conditioning (HVAC) system. Plenum spaces are separated from the general living or residential spaces, typically comprising the spaces above the dropped ceiling or below the raised floor. As wireless access points become more prevalent, network installers are placing an increasing number of cable connections within the ceiling.

Because plenum spaces facilitate free circulation of air between rooms of the building, the presence of fire, smoke, or toxic gases within a plenum space poses a high safety risk. To mitigate this risk, the National Fire Protection Association (NFPA) has defined standards that dictate the types of materials that may be used for cables and related accessories residing within plenum spaces.

Horizontal cabling within plenums and other building spaces are often hung on J-hooks and terminated to a jack within the space (e.g., in the plenum space above the dropped ceiling) or by field terminating a plug. These termination practices yield a poor connection that is susceptible to accidental disconnection if the suspended jack or plug is physically impacted, or if an excessive amount of strain is placed on the cable.

The above-described deficiencies of current horizontal cabling techniques are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments relate to a connector mounting bracket that provides a means by which to suspend a connectorized cable in a ceiling space, resulting in a robust, strain-resistant coupling between the cable and the connectors terminated thereto. The bracket can be clipped to a drop wire within a ceiling space, thereby suspending the bracket within the ceiling space. The bracket includes a means for mounting a connector (e.g., a modular jack, connector, port or adapter to receive the same—collectively "connector") directly on the bracket, as well as a means for mounting a surface mount box housing one or more connectors. By providing a means to suspend a connector within a ceiling space, the bracket provides a greater degree of protection and strain relief compared to the coupling between cables and the connectors terminated thereto that are not so mounted.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

BRIEF DESCRIPTION OF DRAWINGS

FIG. 9D is a view of a two-port surface mount box installed on a bracket such that two port openings of the box are facing right.

DETAILED DESCRIPTION

Figure 1:
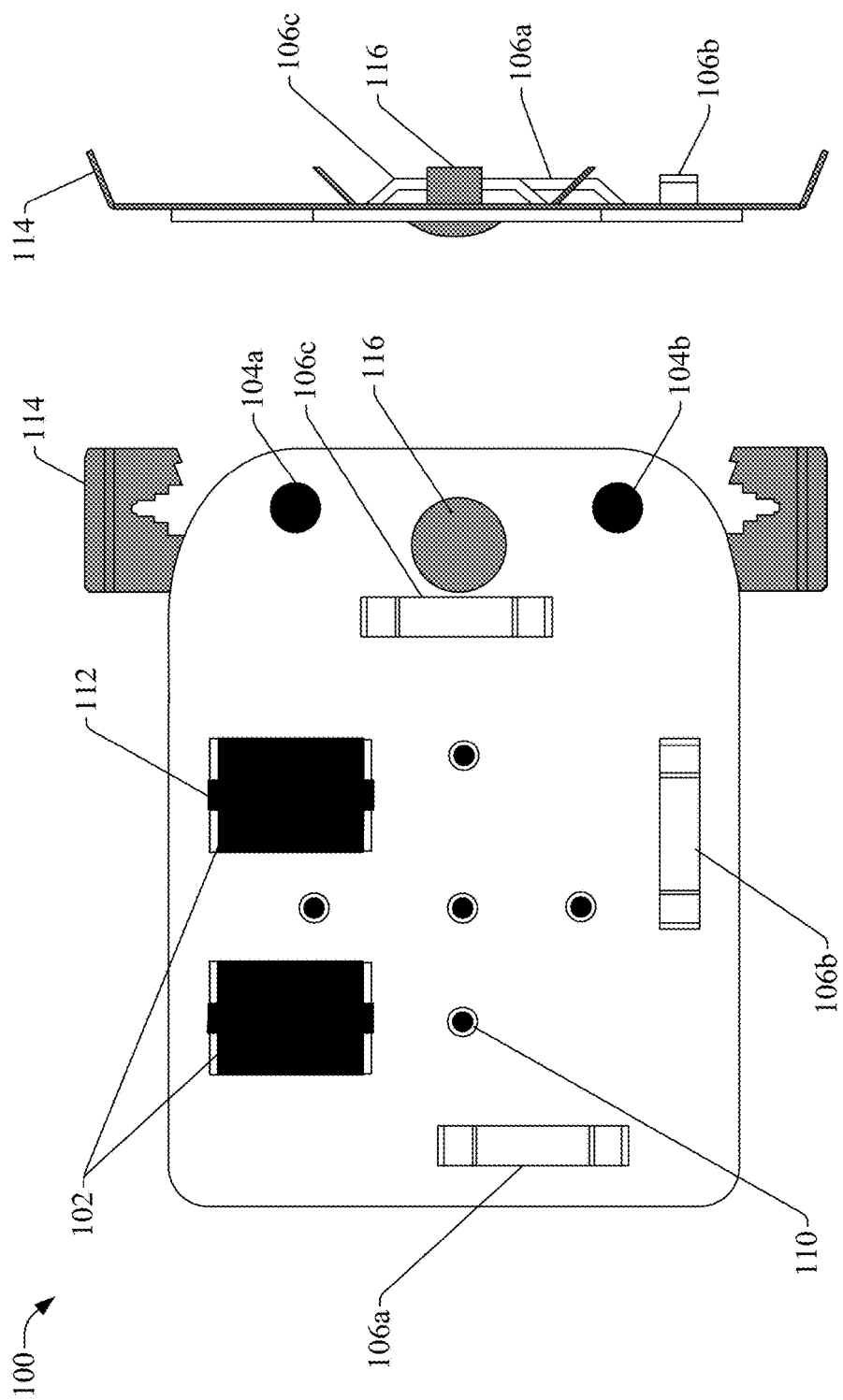
FIG. 1 is an orthographic view of an example mounting bracket for installing connectors within a ceiling space.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Figure 2:
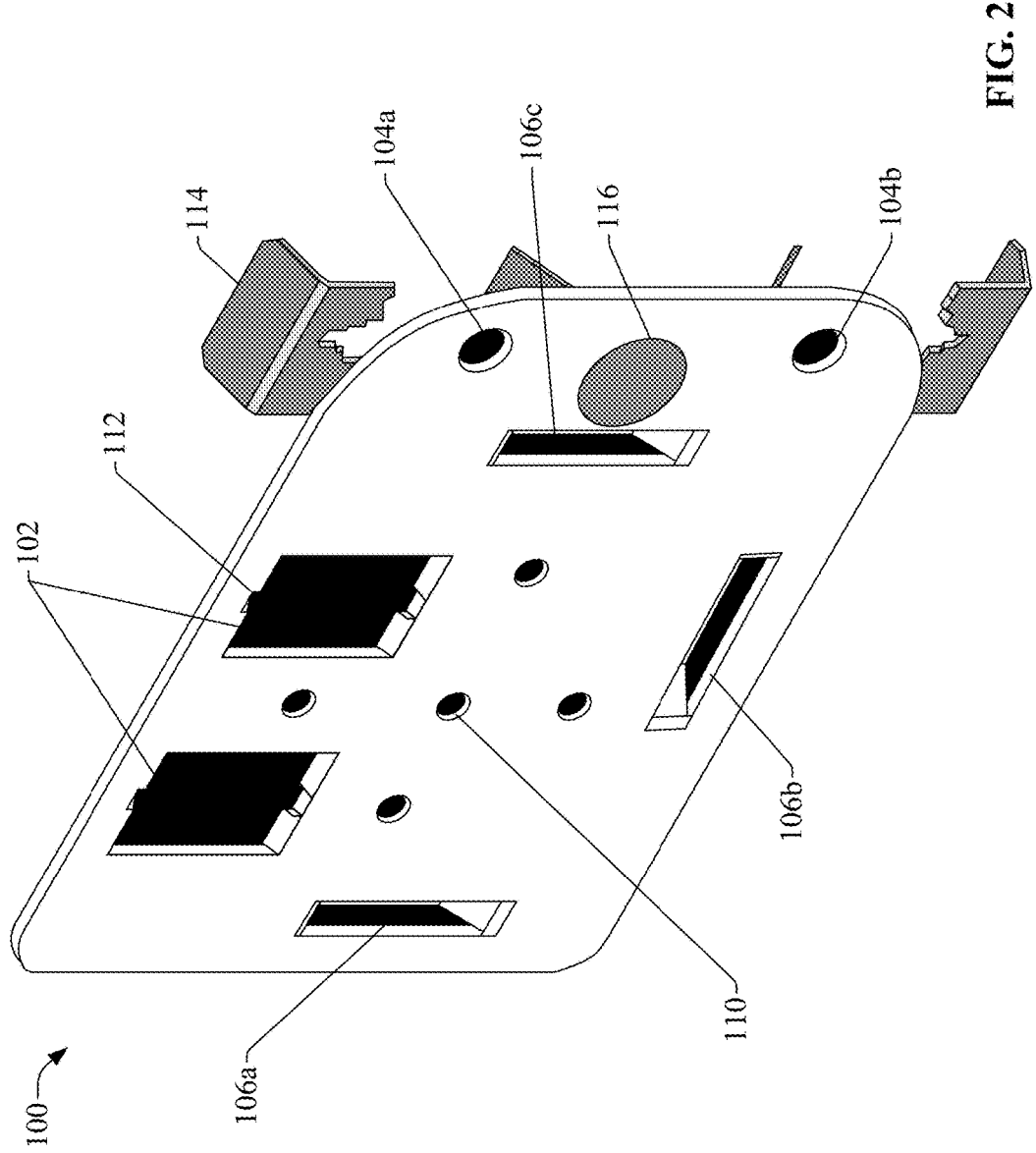
FIG. 2 is a three-dimensional front view of an example bracket for installing connectors within a ceiling space.
Figure 3:
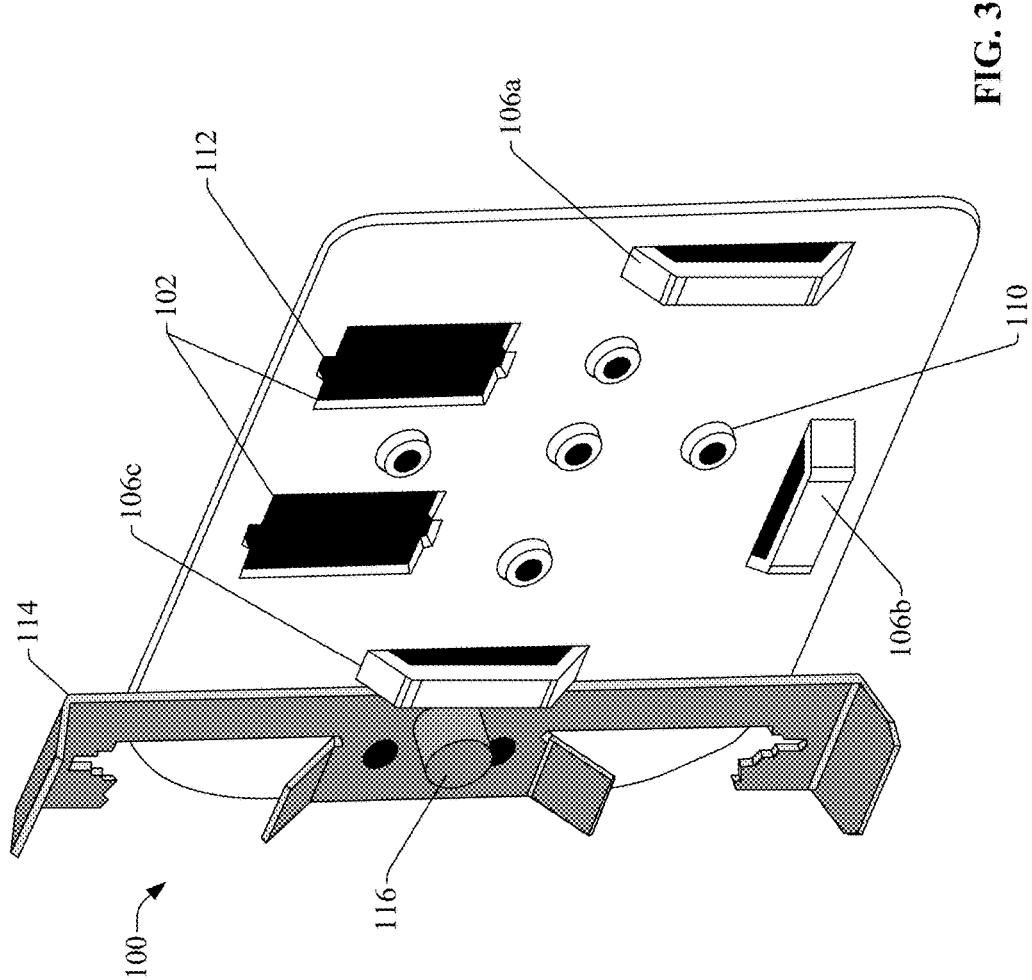
FIG. 3 is a three-dimensional rear view of an example bracket for installing connectors within a ceiling space.

FIG. 1 is an orthographic view of an example mounting bracket 100 for installing connectors within a ceiling space according to one or more embodiments. FIG. 2 is a three-dimensional front view of bracket 100, and FIG. 3 is a three-dimensional rear view of bracket 100. Bracket 100 can be made of any suitable material, including but not limited to plastic or metal (e.g., galvanized steel or other metal or metal alloy). In one or more embodiments, bracket 100 can be made of a plenum-rated material that does not emit toxic fumes when exposed to heat or burning, in compliance with National Electrical Code 300-22(b). A clip 114 is affixed to the right side of the bracket 100 using a bolt 116 or other mounting hardware (e.g., a rivet, a screw, etc.). Alternatively, in one or more embodiments, clip 114 may be formed as a continuous portion of the bracket 100, e.g., by shaping the clip 114 from the same section of metal material as the rest of the bracket 100. Clip 114 may be, for example, a multi-function clip such as a bat-wing clip or other type of hardware configured to securely attach the bracket 100 to a drop wire or other rod-like structure within a ceiling space. As shown in FIG. 3, bracket 100 is designed to hold the clip 114 such that a vertical edge of the clip is adjacent and parallel to bridge lance 106c, which resides on substantially the same latitude of the bracket as bolt 116. In this configuration, bridge lance 106c prevents excessive rotation of the clip 114 about the bolt 116. Although FIG. 3 illustrates a bridge lance as the structure for preventing rotation of the clip 114, it is to be appreciated that other structural features may be used in place of the bridge lance without departing from one or more embodiments of this disclosure. For example, a louvre or other protruding feature of the bracket may be used instead of a bridge lance as an anti-rotation mechanism.

In one or more embodiments, bracket 100 may also include additional mounting holes—e.g., mounting holes 104a and 104b located near respective top and bottom corners of the right side of bracket 100—to allow optional direct mounting of the bracket.

Bracket 100 is configured to support both direct installation of connectors on the bracket, as well as installation of a surface mount box containing connectors. A number of punched threads 110 (e.g., threaded holes) are formed at various locations on the bracket for installation of the surface mount box, which will be described in more detail below. For direct installation of connectors, two port openings 102 are disposed on the bracket 100. Although the example bracket of FIGS. 1-3 depicts two port openings formed in bracket 100, any number of port openings may be formed in the bracket, subject to space limitations, without departing from the scope of this disclosure.

Figure 4:
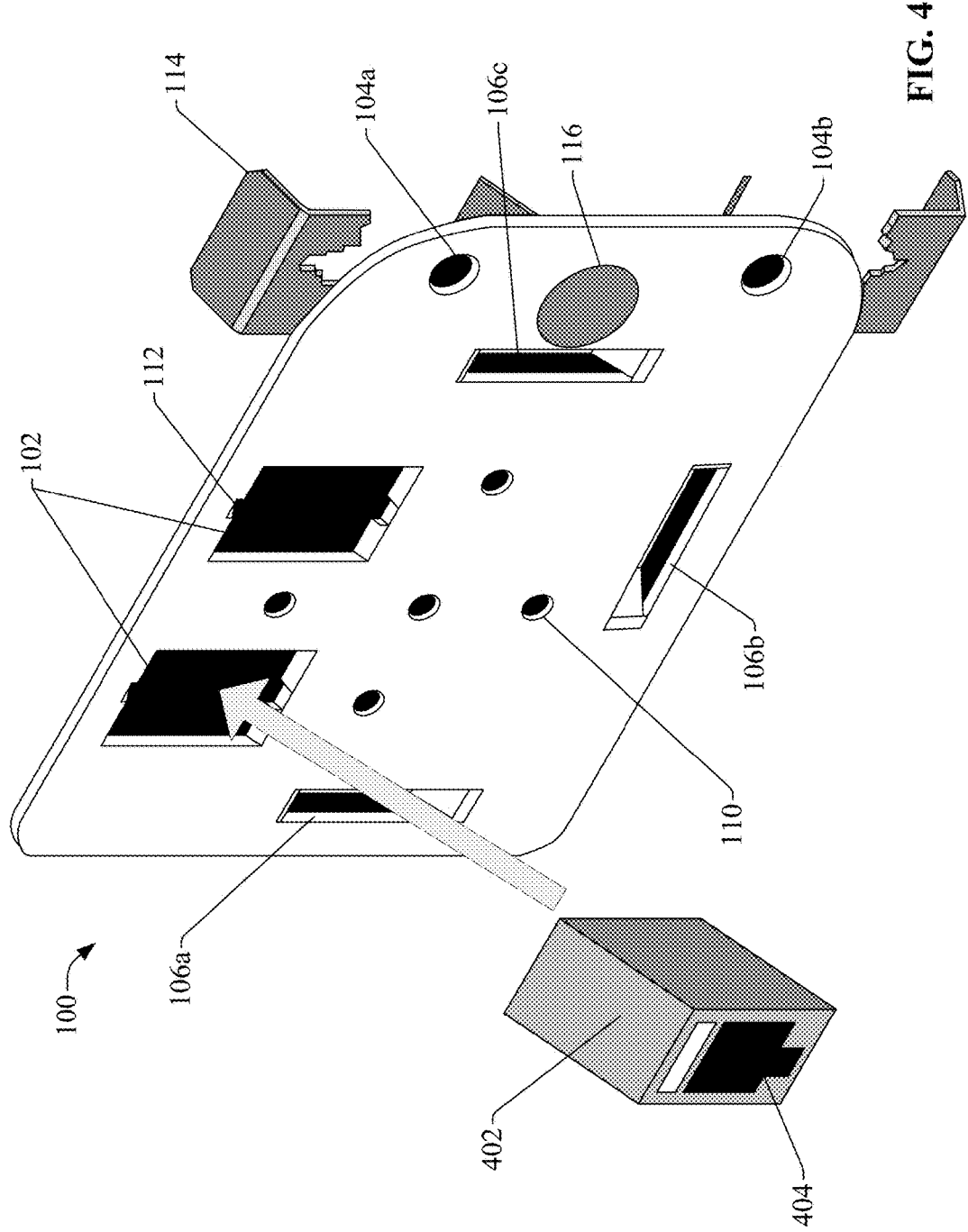
FIG. 4 is a three-dimensional view illustrating installation of a modular connector in one of the port openings of a connector mounting bracket.
Figure 5:
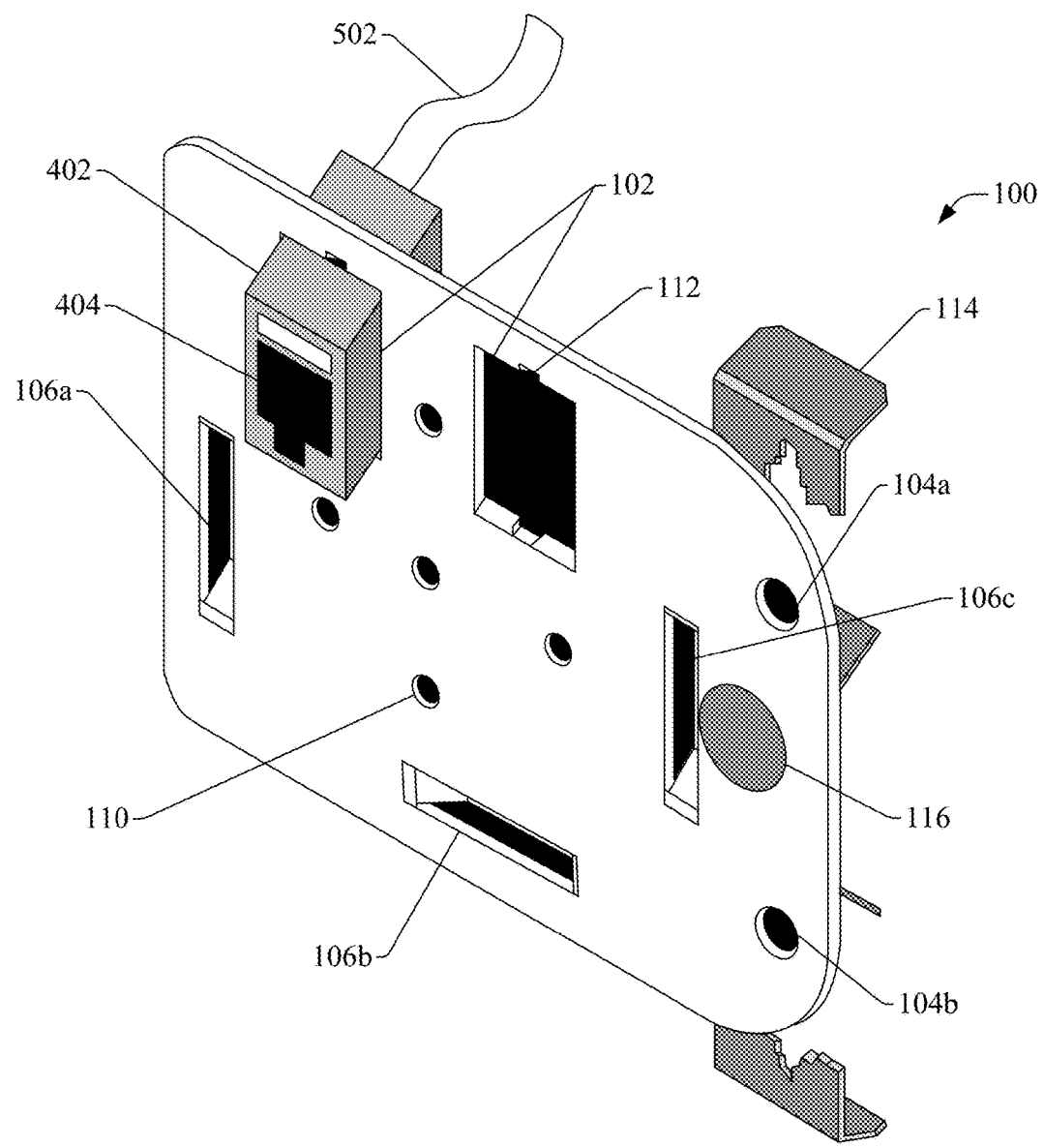
FIG. 5 is a three-dimensional view of a connector mounting bracket with a modular connector installed in a port opening of the bracket.

FIG. 4 is a three-dimensional view illustrating installation of a connector 402 in one of the port openings 102, and FIG. 5 is a three-dimensional view of the bracket with the connector 402 installed in the port opening. Connector 402 may comprise structural elements for terminating a cable 502 or other structural means for connectivity with cabling or other connectors. For example, if cable 502 is a category rated twisted-pair cable (e.g., CAT 6A), and connector 402 a modular jack, connector 402 may include punch-down hardware on its rear side for terminating the cable on the jack. Connector 402 may also include a port 404 on its front face configured to receive a complementary connector. Port 404 may be, for example, an RJ-45 jack configured to receive a RJ-45 plug terminated on the end of a category rated twisted-pair cable (e.g., CAT 5e, CAT 6, CAT 6A, etc.). Alternatively, connector 402 may be an adapter configured to receive a fiber optic connector within port 404. Other embodiments of connector 402 can support other types of connectivity, including but not limited to RJ-11, universal serial bus (USB), high-definition multimedia interface (HDMI), fiber optic, video graphics array (VGA), digital video interface (DVI), coaxial, banana jack, Radio Corporation of America (RCA), Bayonet Neill-Concelman (BNC), Thunderbolt, or other connector types.

As shown in FIG. 4, connector 402 can be directly mounted on bracket 100 by inserting the connector 402 through a port opening 102. Each port opening 102 can be shaped to interface with connection hardware or accessories built into the connector 402. For example, notches 112 on the top and bottom edge of each port opening 102 can be configured to receive spring-loaded clips located on the top and bottom of connector 402 (or on a mounting jacket that fits on the outside of connector 402) to facilitate locking the connector 402 in place when inserted through the port opening 102. Once installed, connector 402 can be unlocked and removed from the bracket 100 by applying pressure to the spring-loaded clips.

Figure 6:
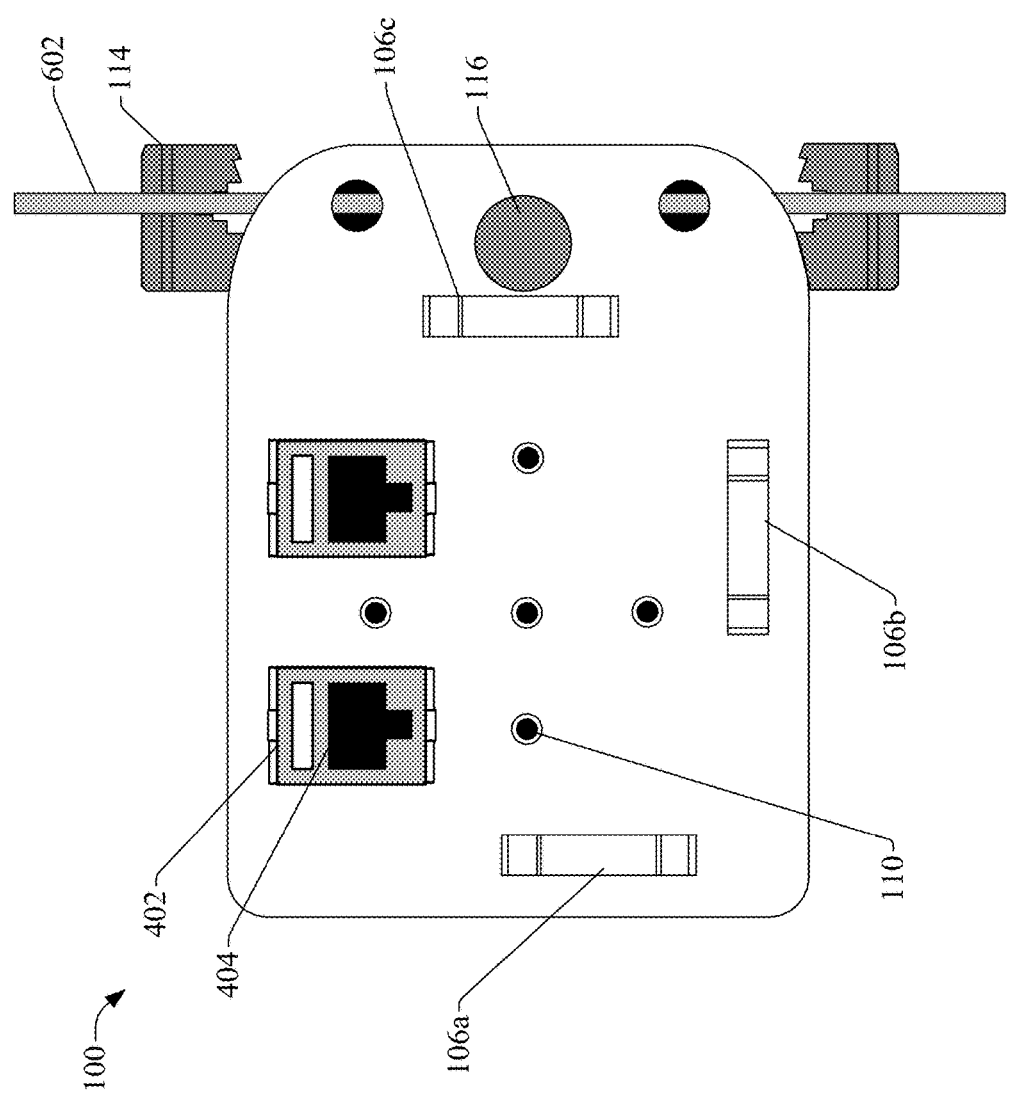
FIG. 6 is a view of a connector mounting bracket affixed to a drop wire.

FIG. 6 is a view of the bracket affixed to a drop wire 602 within a dropped ceiling space, with two connectors 402 installed in the port openings 102 of the bracket. Such drop wires are often found in drop-ceiling installations supporting the ceiling framework. Using the modified bracket including the clip (i.e., the bracket-clip assembly), these drop wires can serve as installation points for connectors 402. Securing the bracket 100 on the drop wire 602 or other rod-like structure (e.g. a threaded wire) using clip 114 yields a reliable in-ceiling installation for connectors 402. As shown in FIG. 5 a cable 502 (e.g., a CAT 6A cable or other type of data cable) is terminated on the rear side of the connector 402. A second cable (not shown) running inside the ceiling space and terminated with an appropriate type of plug can be plugged into port 404 of either of the connectors 402, thereby electrically connecting the two cables.

Raised bridge lances 106 or other loop structures formed on the bracket 100 can be used in conjunction with cable ties to organize excess cabling or to provide additional strain relief. For example, an installer may wish to neatly secure excessive loops of cable (e.g., service loops) to the bracket in case a cable plug must be replaced, to ensure that a sufficient amount of loose cable is available near the connectors 402 after the original plug is cut from the cable. Bridge lances 106 can be used to tie these service loops to the bracket 100 using cable ties (e.g., nylon or hook & loop cable ties).

Figure 7:
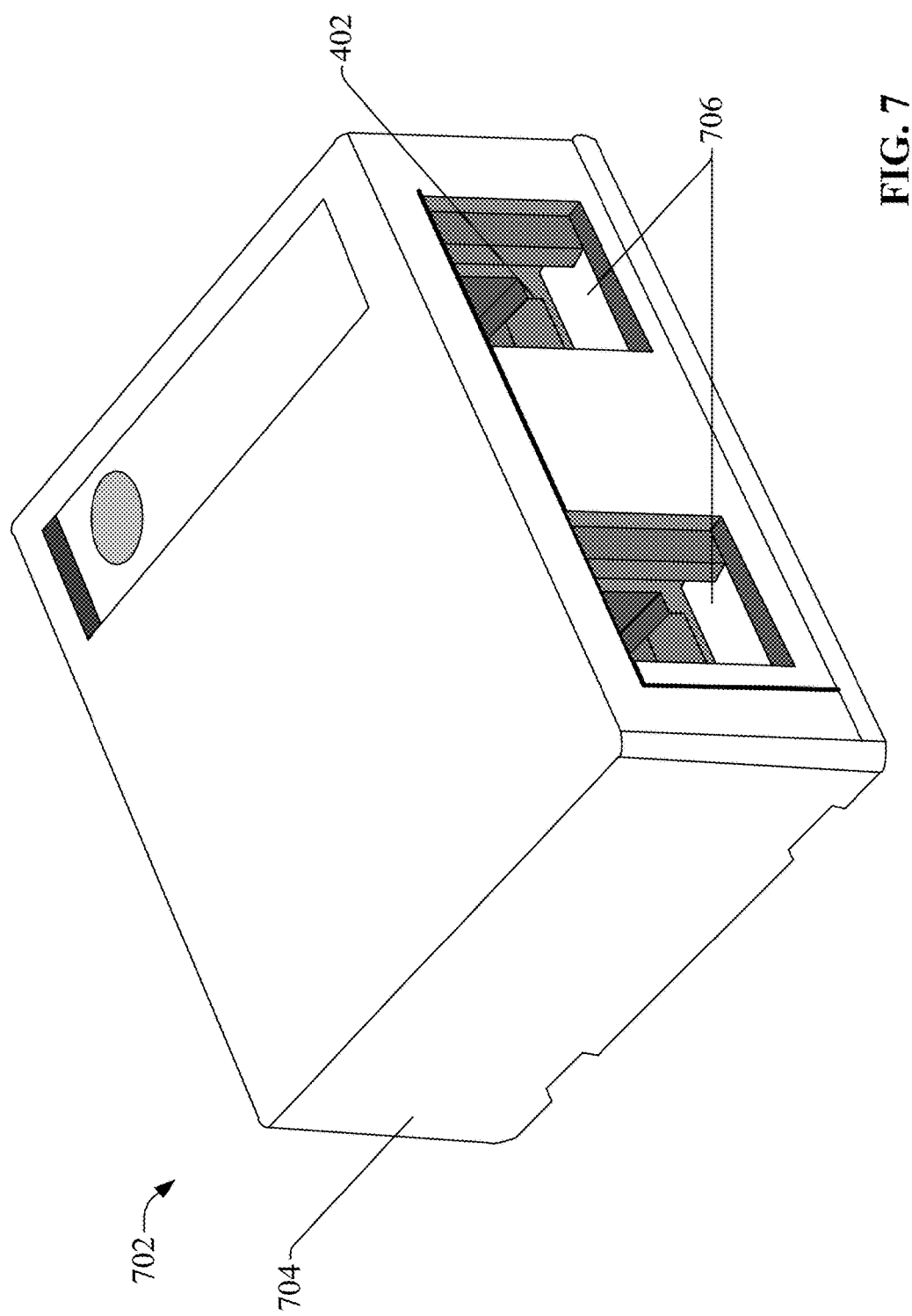
FIG. 7 is a three-dimensional view of an example surface mount box that can be mounted on a connector mounting bracket.

As noted above, in addition to supporting direct installation of connectors 402 into port openings 102, bracket 100 is also configured to support installation of a surface mount box that can be used for horizontal cabling connections. FIG. 7 is a three-dimensional view of an example surface mount box 702 that can be mounted on bracket 100. Surface mount box 702 comprises a housing 704 and one or more cable ports openings 706 disposed on one or more sides of the box. In one or more embodiments, the housing 704 can comprise a plenum-rated material that does not emit harmful fumes if subjected to heat or burning, in compliance with National Electrical Code 300-22(b). Connectors 402 can be installed inside the surface mount box 702 behind the cable port openings 706, allowing cable plugs terminated to cables to be inserted through the cable port openings 706 and plugged into the connectors 402. Similar to the connectors described above, connectors 402 can be provided to support substantially any type of data connectivity type, including but not limited to RJ-45, RJ-11, USB, HDMI, fiber optic, VGA, DVI, banana jack, RCA, BNC, or other connector types. Moreover, in some embodiments, connectors 402 may be permanently installed components of surface mount box 702 rather than removable modular components. By disposing the connectors in a recessed location inside the housing 704, surface mount box 702 can protect the connectors and the cable plugs inserted therein from physical impact. The surface mount box 702 is also designed to provide strain relief for the cable connections, yielding a reliable and secure connection.

Figure 8:
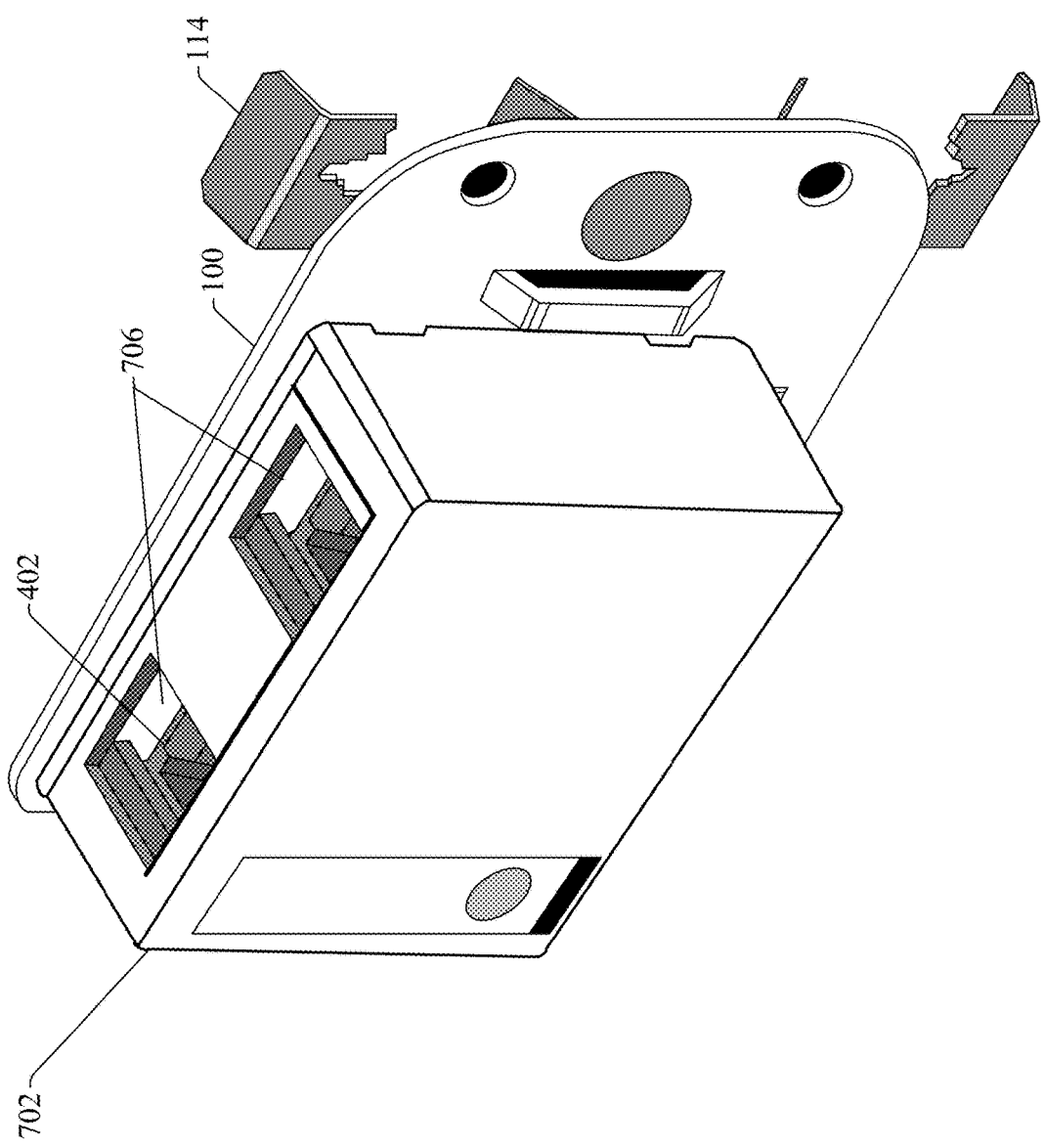
FIG. 8 is a three-dimensional view of a surface mount box mounted on a connector mounting bracket.
Figure 9A:
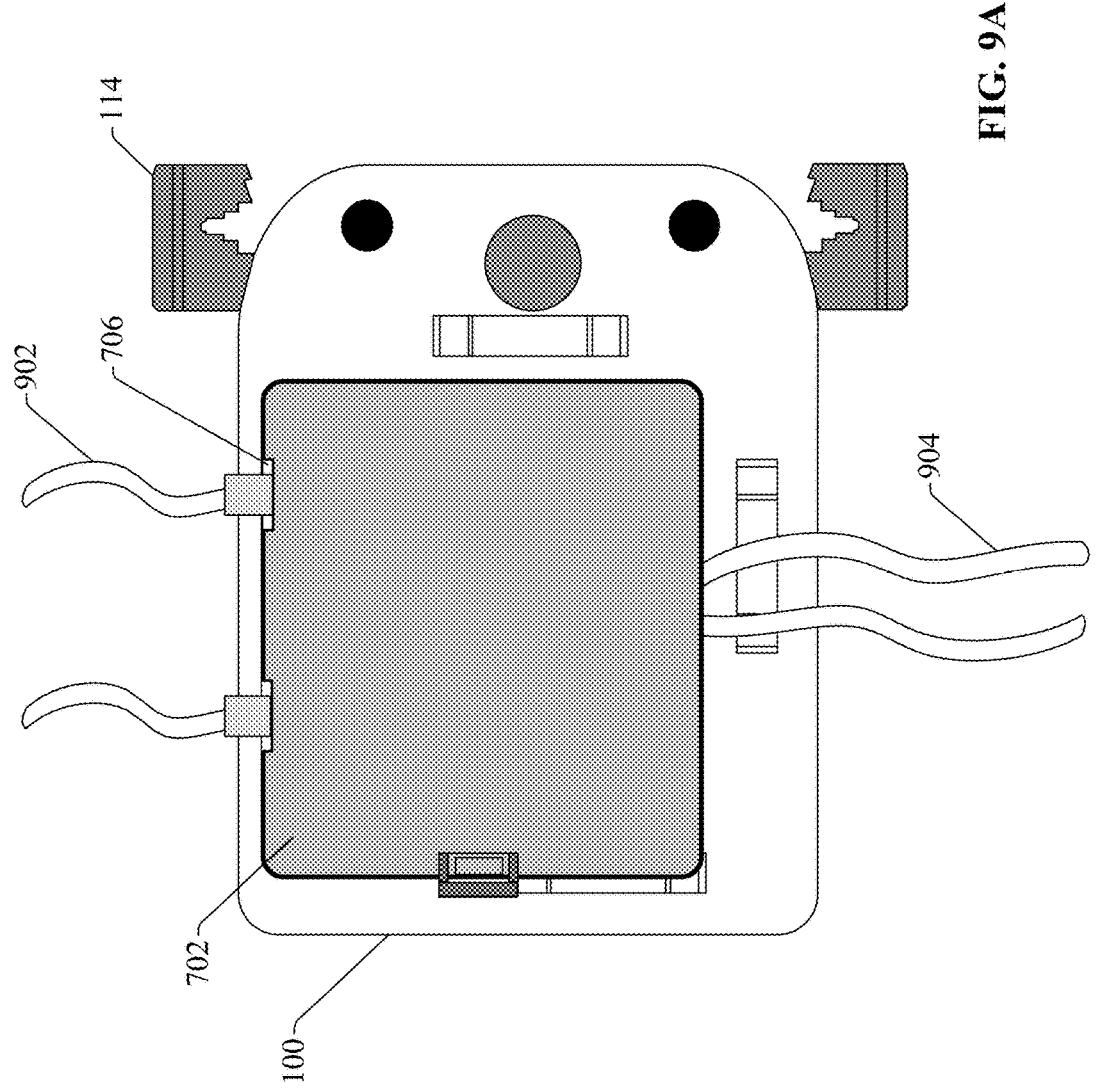
FIG. 9A is a view of a two-port surface mount box installed on a bracket such that two port openings of the box are facing upward.

FIG. 8 is a three-dimensional view of the surface mount box 702 mounted on bracket 100. Surface mount box 702 can be installed on the bracket 100 using mounting hardware (e.g., screws, bolts, etc.) through the punched threads 110 of the bracket (see FIGS. 1-6). Bracket 100 can then be suspended within a ceiling space using clip 114. As shown in FIGS. 9A-9D, surface mount box 702 can be selectively mounted on bracket 100 in one of several possible orientations. FIG. 9A depicts a two-port surface mount box installed on bracket 100 such that the two cable port openings 706 face upward, allowing cables 902 with plug terminations to be connected to the modular connectors inside the surface mount box through the top-facing surface of the box. Cables 904 entering from the bottom-facing surface of the box are each terminated on the rear side of one of the connectors inside the housing of the surface mount box. Thus, plugging a cable plug terminated to one of the cables 902 into one of the connectors residing in the surface mount box connects that cable 902 to one of the cables 904 terminated on that connector.

Figure 9B:
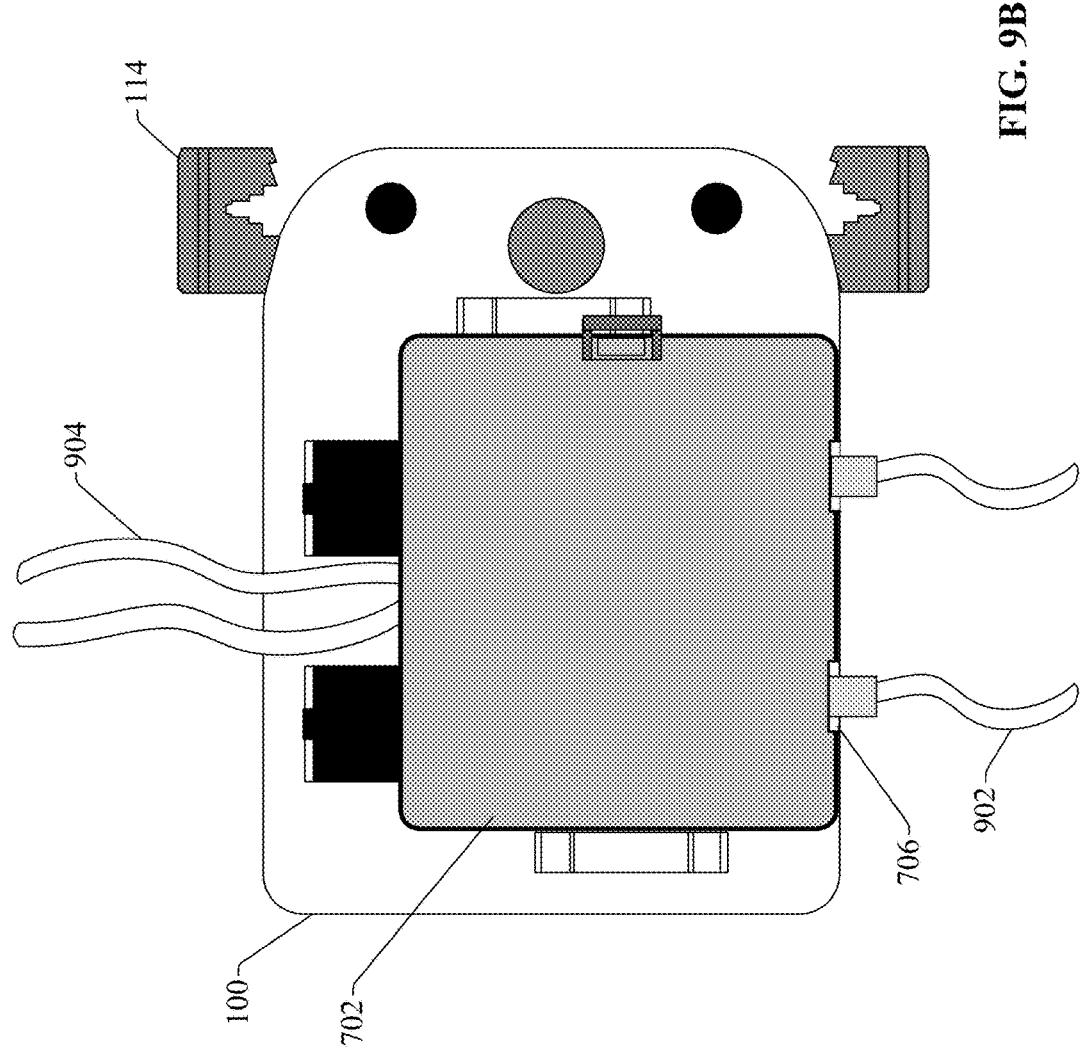
FIG. 9B is a view of a two-port surface mount box installed on a bracket such that two port openings of the box are facing downward.
Figure 9C:
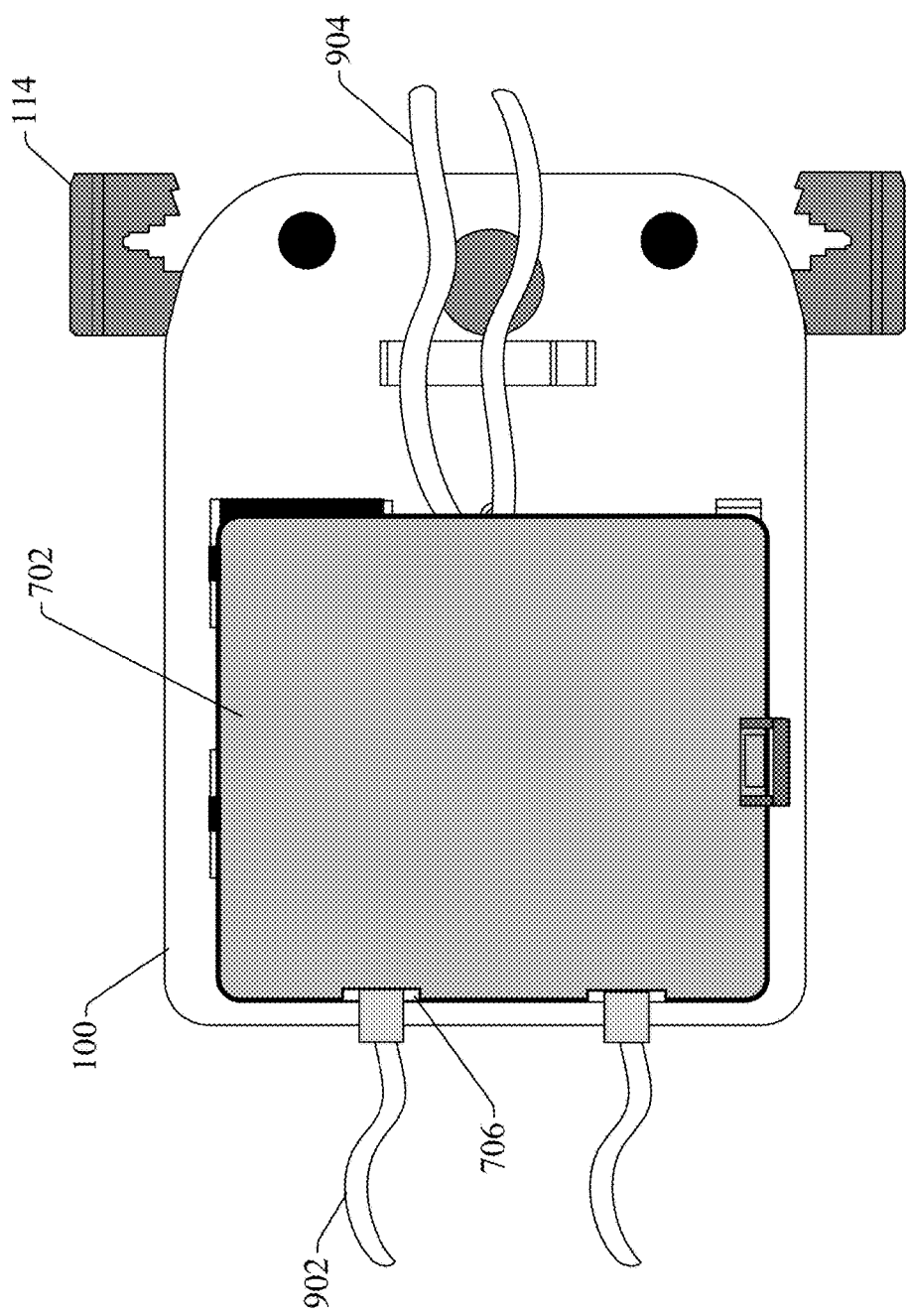
FIG. 9C is a view of a two-port surface mount box installed on a bracket such that two port openings of the box are facing left.

FIG. 9B depicts surface mount box 702 installed on bracket 100 rotated relative to the orientation in FIG. 9A, such that the cable port openings 706 are facing downward. This orientation allows the cable plugs of cables 902 to be plugged into the connectors of the surface mount box from the downward direction. FIGS. 9C and 9D depict surface mount box 702 oriented on bracket 100 such that the cable port openings 706 are facing in the left and right directions, respectively. In general, the locations of punched threads 110 on bracket 100 allow surface mount box 702 to be selectively mounted in any of these orientations, allowing an installer to select the most suitable connector orientation for a given cabling installation project.

Figure 10:
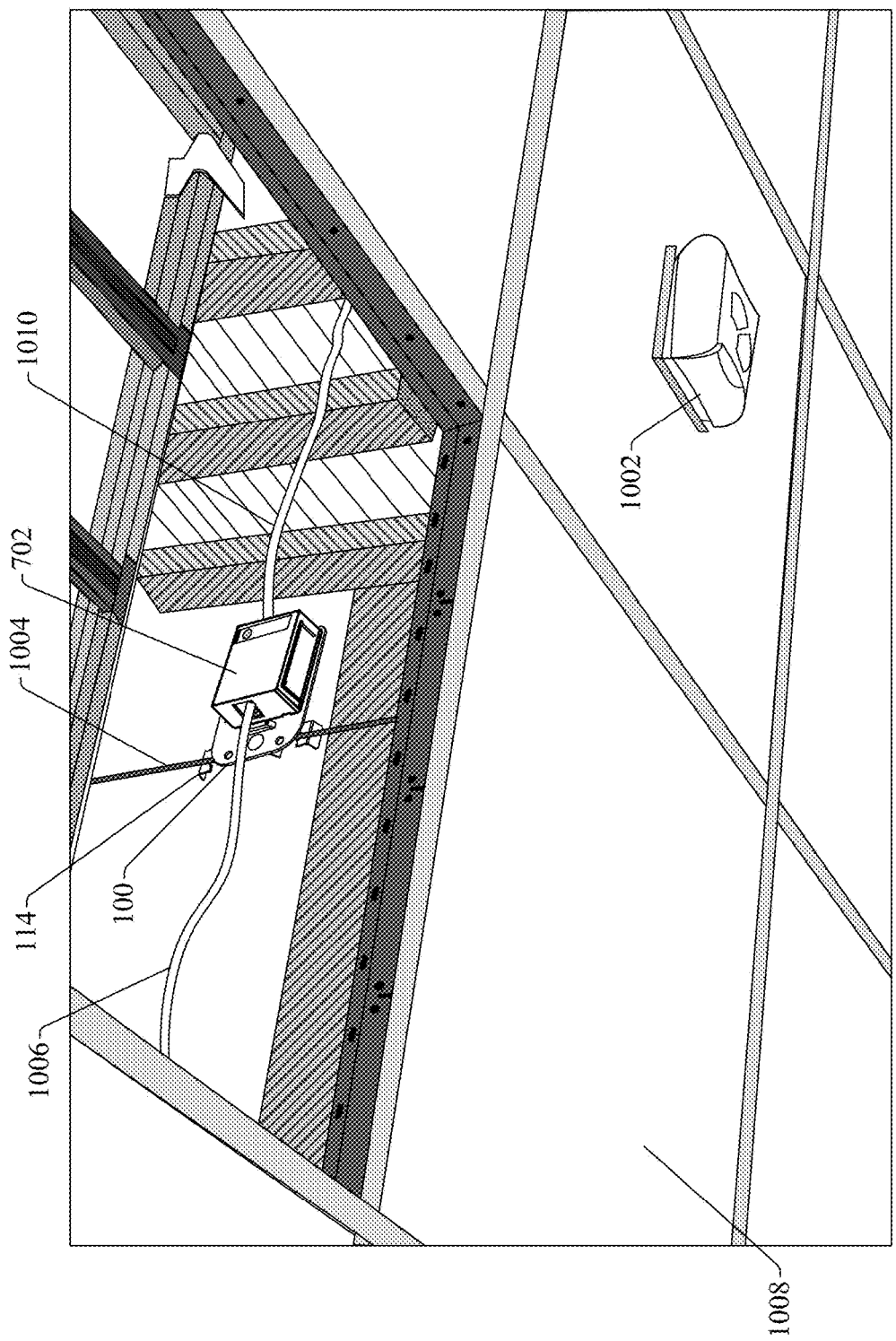
FIG. 10 is a view of an example installation of a connector mounting bracket within a ceiling space.

FIG. 10 is a view depicting bracket 100 installed within a ceiling space. In this example, a ceiling-mounted wireless access point device 1002 is installed on dropped ceiling 1008. The wireless access point device 1002 is networked to telecommunications equipment elsewhere in the building via horizontal cabling routed through the plenum space above the dropped ceiling. FIG. 10 depicts the ceiling 1008 with a panel removed to reveal the plenum space. Bracket 100 is affixed to an existing drop wire 1004 inside the plenum space using clip 114, and a single-port surface mount box 702 is mounted to the bracket 100 as described in previous examples. This configuration suspends the bracket and surface mount box 702 above the floor of the dropped ceiling. A cable 1010 from the wireless access point device 1002 is terminated on the connector inside the housing of the surface mount box 702, where the connector may be terminated to an end of another cable 1006. Thus, the bracket 100, clip 114, and surface mount box 702 provide a secure and strain-resistant installation for the connector inside the ceiling. A cable plug terminated to cable 1010 can be plugged into the connector through the port opening of the surface mount box housing. In addition to providing a robust installation for the connector, installing the bracket 100 on drop wire 1004 keeps the connector suspended above the floor of the dropped ceiling, allowing the connector to be accessed more easily, protecting the connector from inadvertent trampling, and resulting in a neater and more organized cable connection.

The use of bracket 100 to suspend cable connectors in a ceiling space can provide a more reliable and consistent cable connection relative to a loose connector within the ceiling space. Bracket 100 and its associated components can provide a complete solution for termination of horizontal cabling within a ceiling space, including features that facilitate secure mounting of a connector, proper cable routing and organization, and ready accessibility to the connector. Moreover, once a plug-terminated cable is plugged into a connector mounted on the bracket 100 and the resulting communication link is tested, the bracket can be easily moved to another mounting location without unplugging the cable from the connector (e.g., in the event that a wireless device associated with the connector needs to be moved), thereby eliminated the need to retest the communication link after relocating and remounting the bracket.

Figure 11:
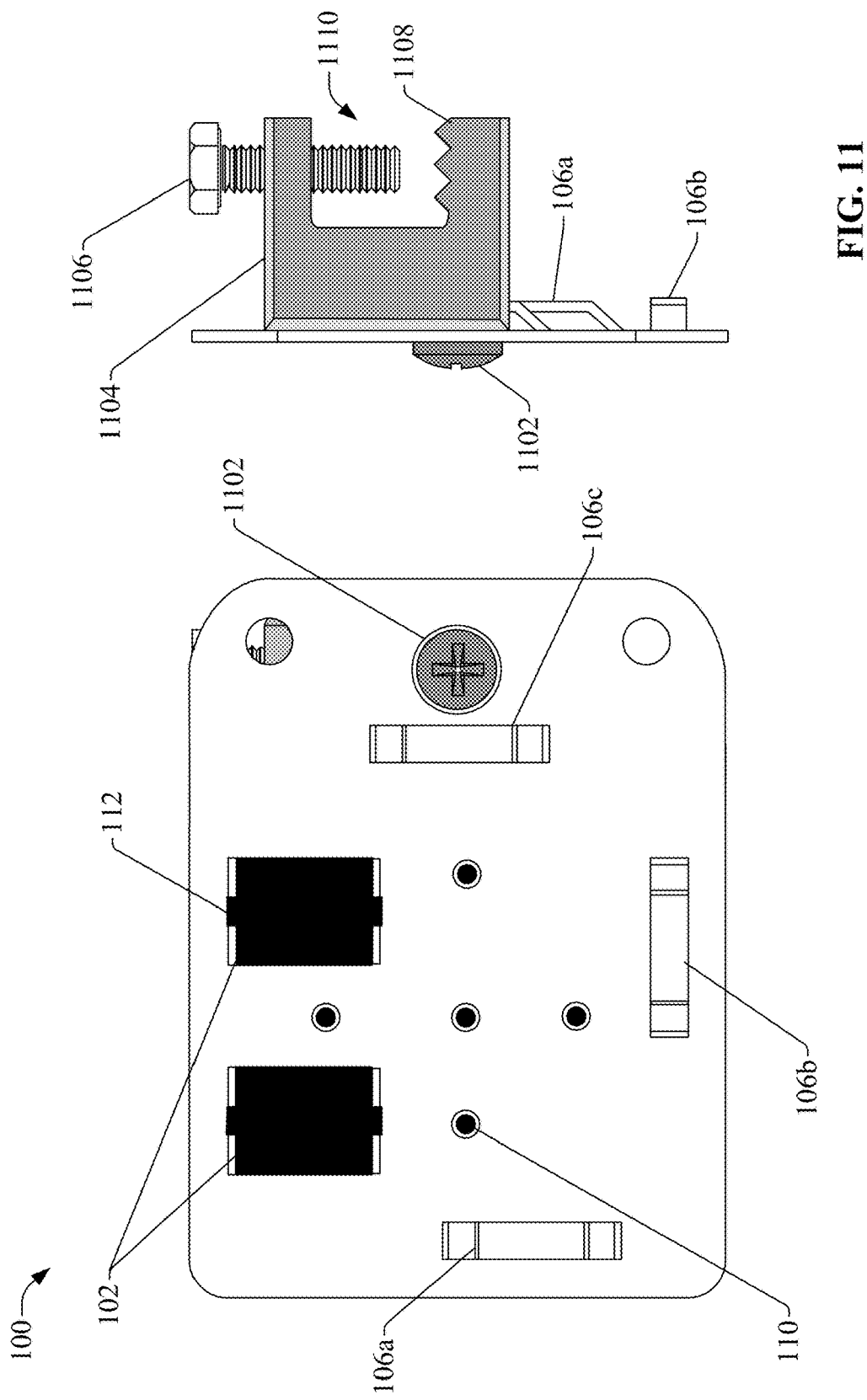
FIG. 11 is an orthographic view of example mounting bracket that includes a beam clamp.
Figure 12:
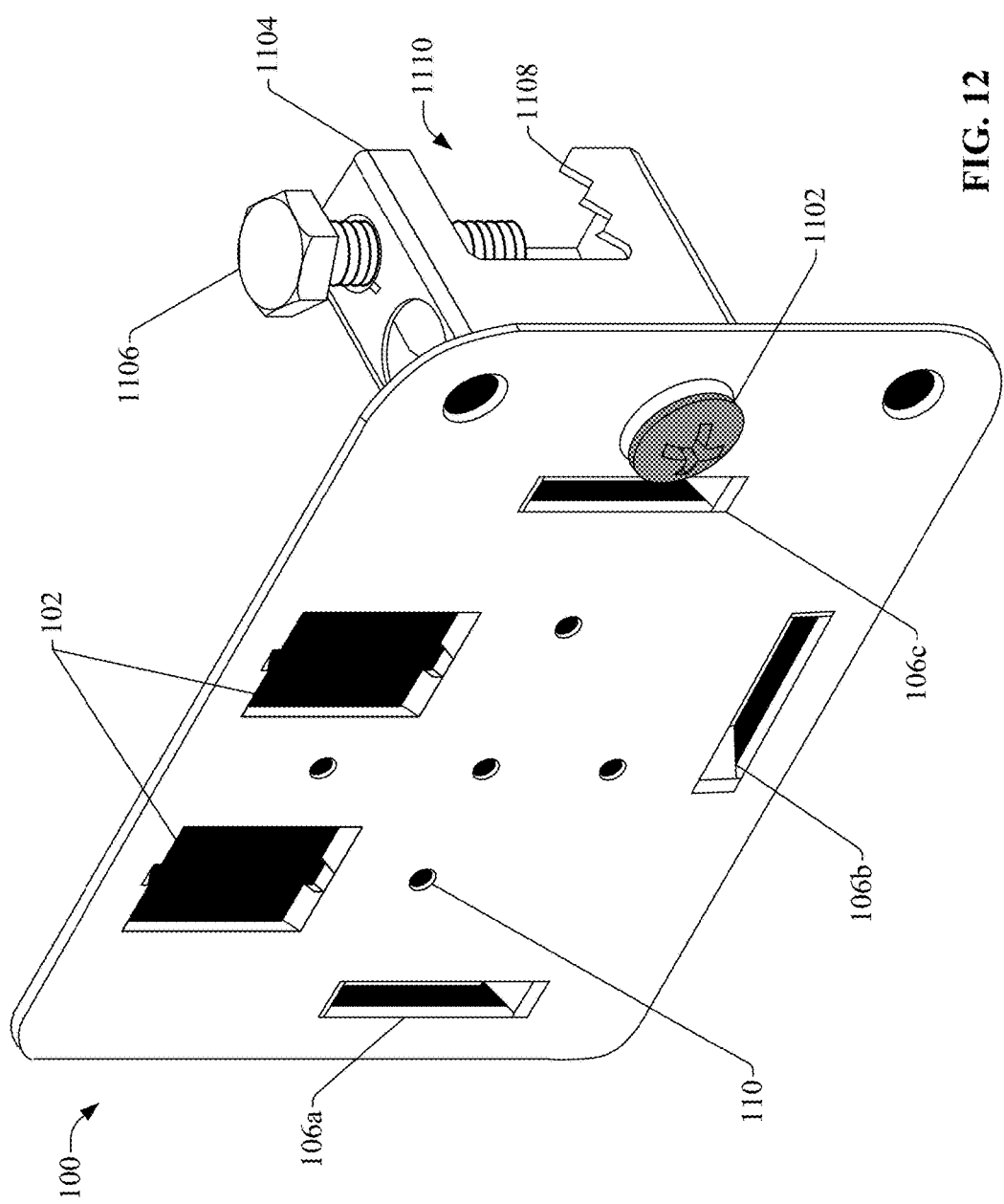
FIG. 12 is a three-dimensional front view of a bracket with attached beam clamp.

In the example configurations described above, clip 114 is used to affix mounting bracket 100 to a drop wire within a plenum space. In some embodiments, mounting bracket 100 can be adapted to mount on a beam or other type of surface by replacing clip 114 with another type of mounting mechanism. FIG. 11 is an orthographic view of example mounting bracket 100 that includes a beam clamp 1104 in place of clip 114. FIG. 12 is a three-dimensional front view of bracket 100 with attached beam clamp 1104. Similar to the mounting configuration for clip 114, beam clamp 1104 is mountable on the right side of bracket 100 using a bolt 1102 or other mounting hardware (e.g., a rivet, a screw, etc.) inserted through a hole near the right-side edge of the bracket (e.g., the same hole used to affix clip 114 to the bracket 100). Alternatively, in one or more embodiments, beam clamp 1104 may be formed as an integrated component of bracket 100. As shown in FIG. 11, bracket 100 is designed to hold the beam clamp 1104 such that a vertical side of the clamp is adjacent and parallel to bridge lance 106c. In this configuration, bridge lance 106c prevents excessive rotation of the beam clamp 1104 about the bolt 1102.

In the illustrated example, beam clip 1104 has a C-shaped or U-shaped structure and mounts to the bracket 100 such that the recess 1110 of the clamp faces rear-ward away from the bracket 100. A bolt 1106 is screwed through a screw hole on the top surface of the clamp 1104. When a beam or other planar surface is inserted into recess 1110 of clamp 1104, bolt 1106 can be screwed down to facilitate clamping bracket 100 on the beam. In the example depicted in FIG. 11, serrated edges 1108 are formed on the lower portion of recess 1110 to prevent the clamp from sliding off the beam while the clamp is tightened on the beam. It is to be appreciated that the beam clamp is not limited to the design depicted in FIGS. 11 and 12, and that any type of clamp capable of fastening to a beam or other type of planar structure is within the scope of one or more embodiments of this disclosure.

Figure 13:
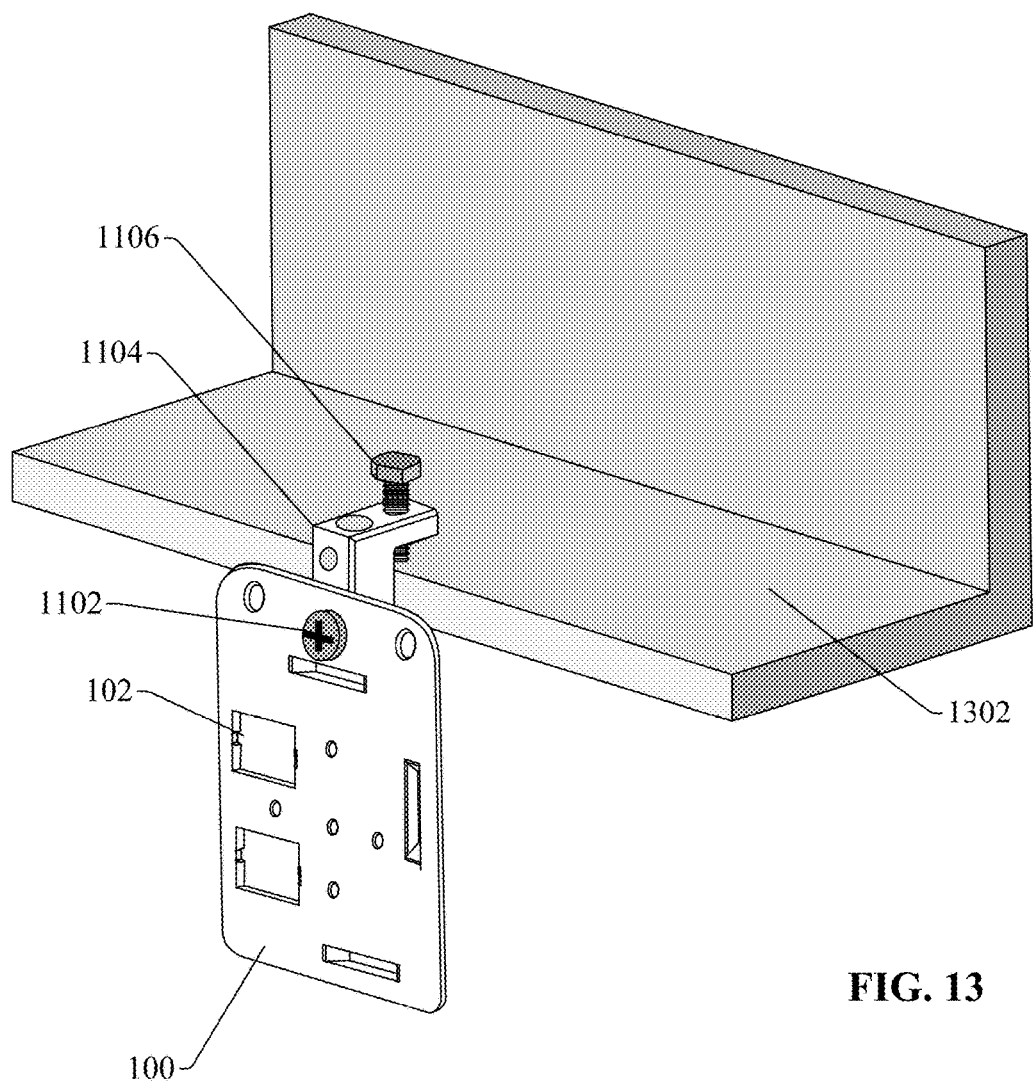
FIG. 13 is a view depicting a mounting orientation in which a bracket with a beam clamp is mounted vertically on the clamp.
Figure 14:
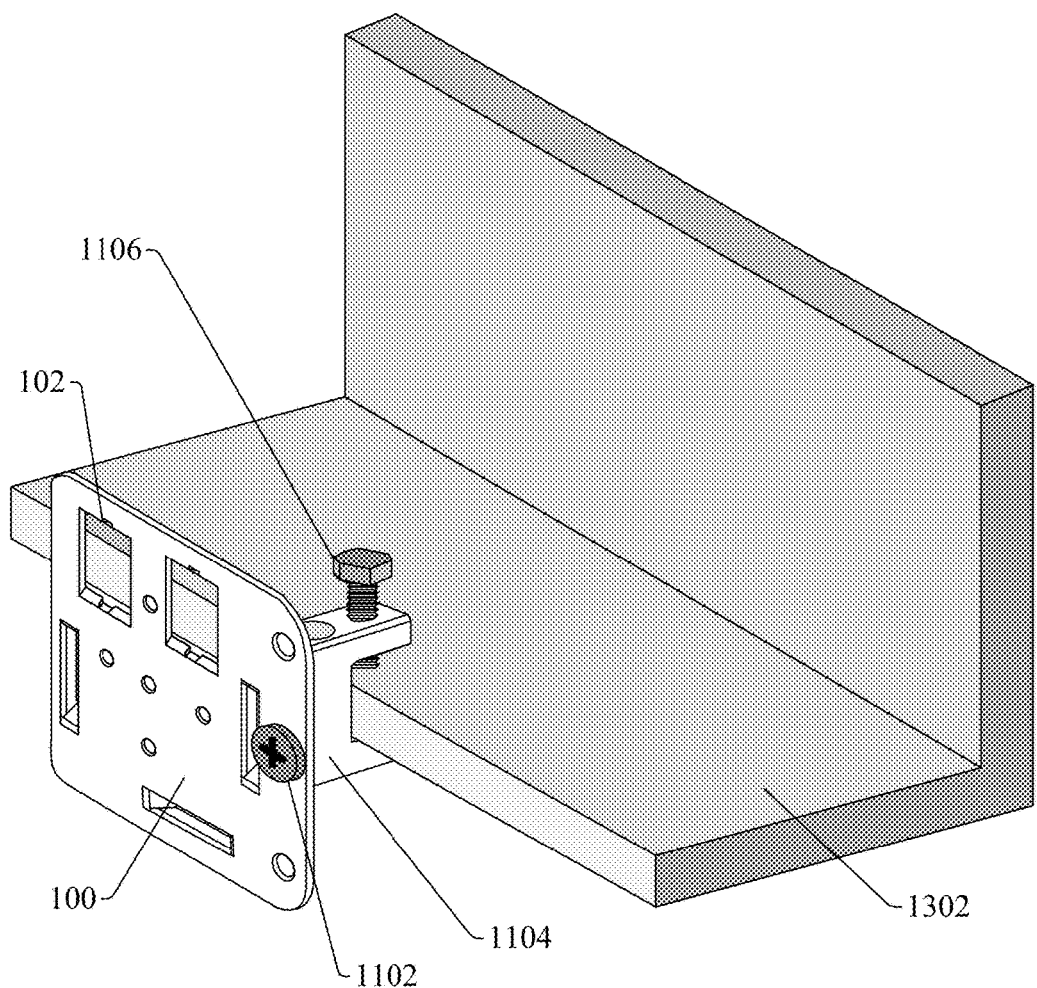
FIG. 14 is a view depicting a mounting orientation in which a bracket with a beam clamp is mounted horizontally on the clamp.

FIGS. 13 and 14 are three-dimensional views illustrating bracket 100 mounted to a beam 1302 using beam clamp 1104. As shown in these drawings, bracket 100 can be mounted on the clamp 1104 in any rotational position about bolt 1102. FIG. 13 illustrates an orientation in which bracket 100 is mounted vertically on clamp 1104, which disposes port openings 102 below the beam 1302, allowing modular connectors (e.g., connectors 402) to be suspended below the beam 1302. FIG. 14 illustrates an alternative orientation in which bracket 100 is mounted horizontally on clamp 1104. As an alternative to inserting connectors directly in the port openings 102, a surface mount box (similar to surface mount box 702) may be mounted on bracket 100 as described in previous examples.

FIGS. 15-19 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 15:
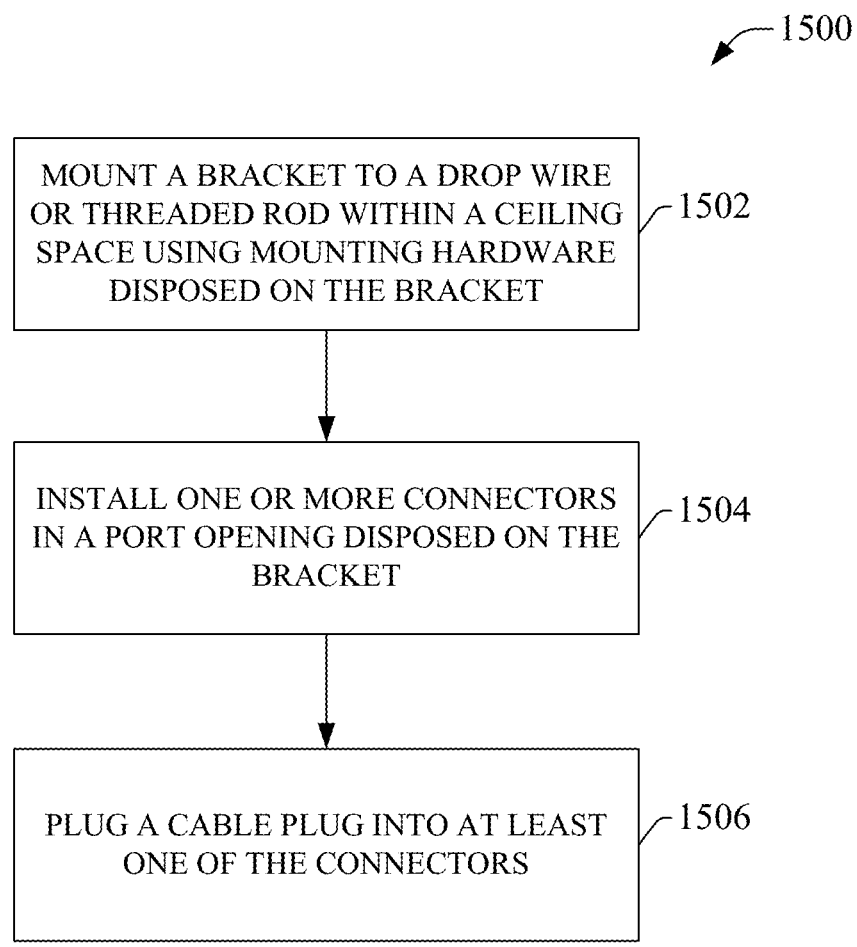
FIG. 15 is a flowchart of an example methodology for mounting a connector in a ceiling space.

FIG. 15 illustrates an example methodology 1500 for mounting a connector in a space above a dropped ceiling. Initially, at 1502, a bracket is mounted to a drop wire or threaded rod within a ceiling space using mounting hardware (e.g., a bat-wing clip or other multi-function clip) located on the bracket. At 1504, one or more connectors are installed in a port opening disposed on the bracket. The connector can be, for example, a modular RJ-45 connector, fiber optic connector, USB port, HDMI port, VGA port, or another type of data or media port. The port opening through the bracket can be shaped to interface with connection hardware on the connector. For example, the port opening can include notches that receive spring-loaded clips formed on the connector or on a mounting jacket fitted to the connector. At 1506, a plug terminated to a cable is plugged into the connector mounted in on the bracket.

Figure 16:
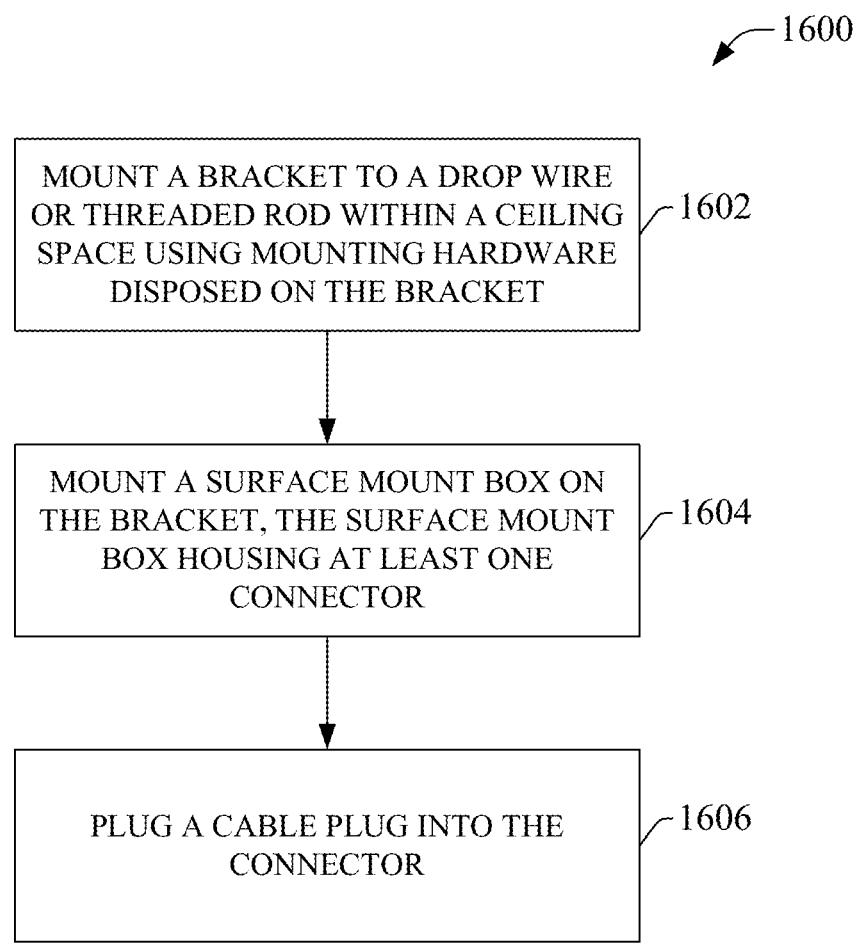
FIG. 16 is a flowchart of another example methodology for mounting a connector in a ceiling space.

FIG. 16 illustrates another example methodology 1600 for mounting a connector in a ceiling space. Initially, at 1602, a bracket is mounted to a drop wire or threaded rod within a ceiling space, similar to step 1502 of methodology 1500. At 1604, a surface mount box is mounted on the bracket, where the surface mount box houses at least one connector. The connector can be a, for example modular connector, jack, or data port installed inside the housing of the surface mount box, or can be a permanently installed component of the box. At 1606, a plug terminated to a cable is plugged into the connector inside the surface mount box.

Figure 17:
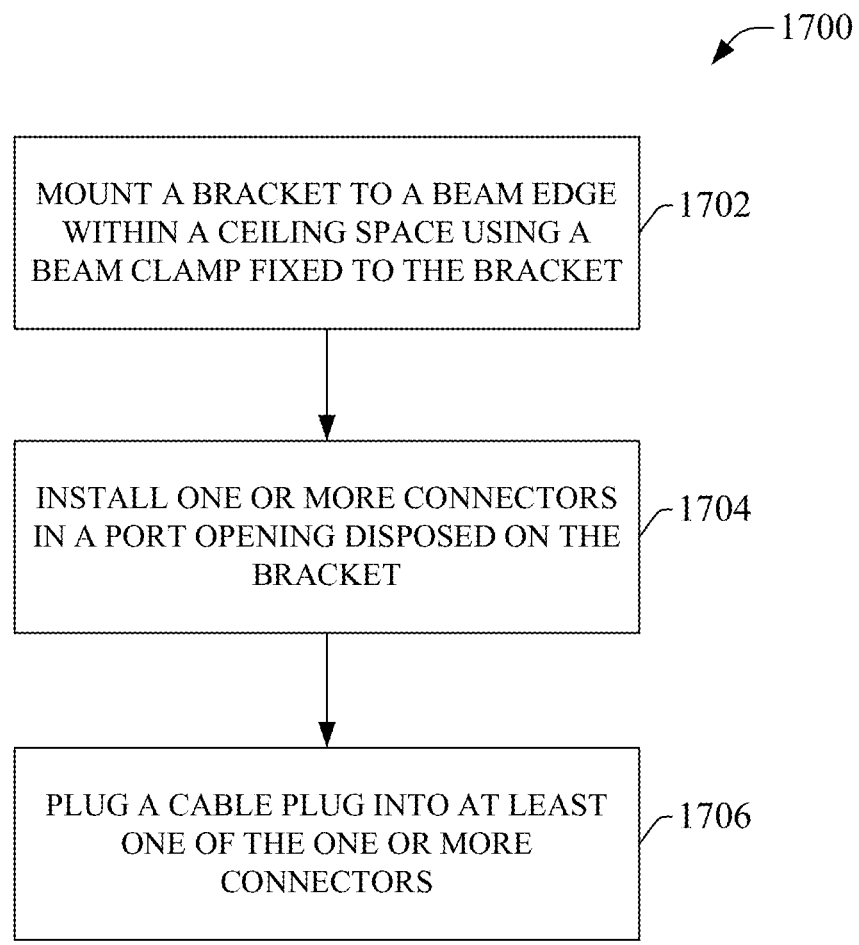
FIG. 17 is a flowchart of another example methodology for mounting a connector within a ceiling space.

FIG. 17 illustrates another example methodology for mounting a connector within a ceiling space. Initially, at 1702, a bracket is mounted to an edge of a beam within a ceiling space using a beam clamp fixed to the bracket. At 1704, one or more connectors are installed in a port opening disposed on the bracket, similar to step 1504 of methodology 1500. At 1706, a plug terminated to a cable is plugged into at least one of the one or more connectors mounted in on the bracket.

Figure 18:
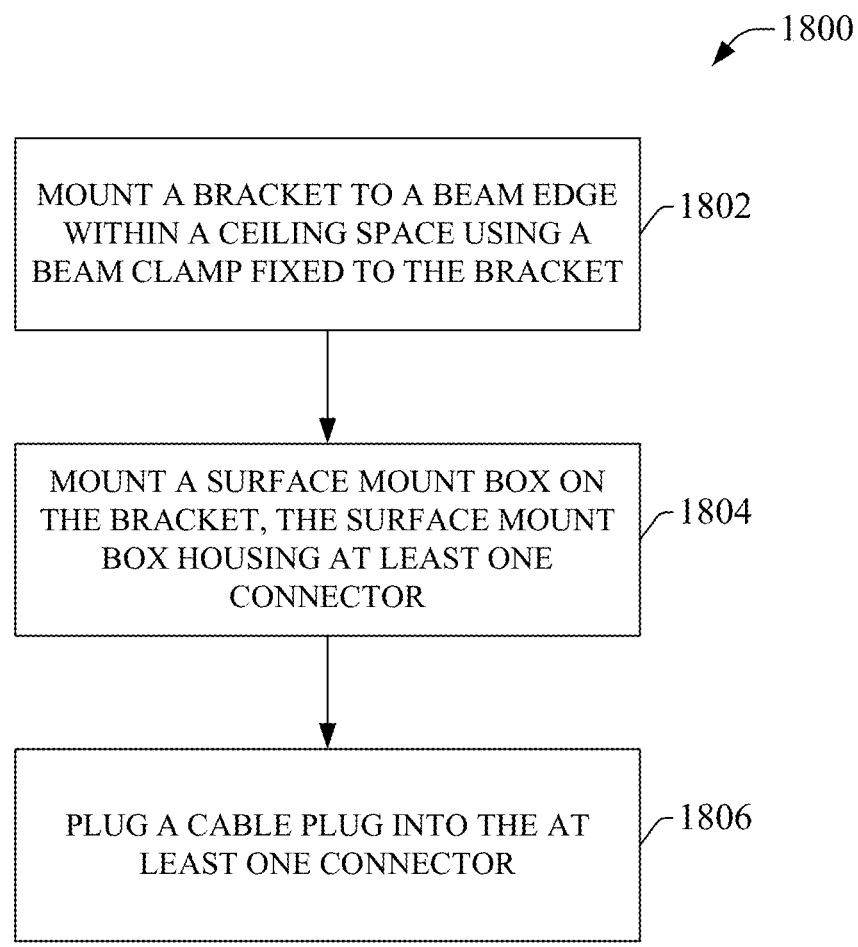
FIG. 18 is a flowchart of another example methodology for mounting a connector in a ceiling space.

FIG. 18 illustrates another example methodology for mounting a connector a ceiling space. Initially, at 1802, a bracket is mounted to an edge of a beam within a ceiling space using a beam clamp fixed to the bracket, similar to step 1702 of methodology 1700. At 1804, a surface mount box housing at least one connector is mounted on the bracket, similar to step 1604 of methodology 1600. At 1806, a plug terminated to a cable is plugged into the at least one connector inside the surface mount box.

Figure 19:
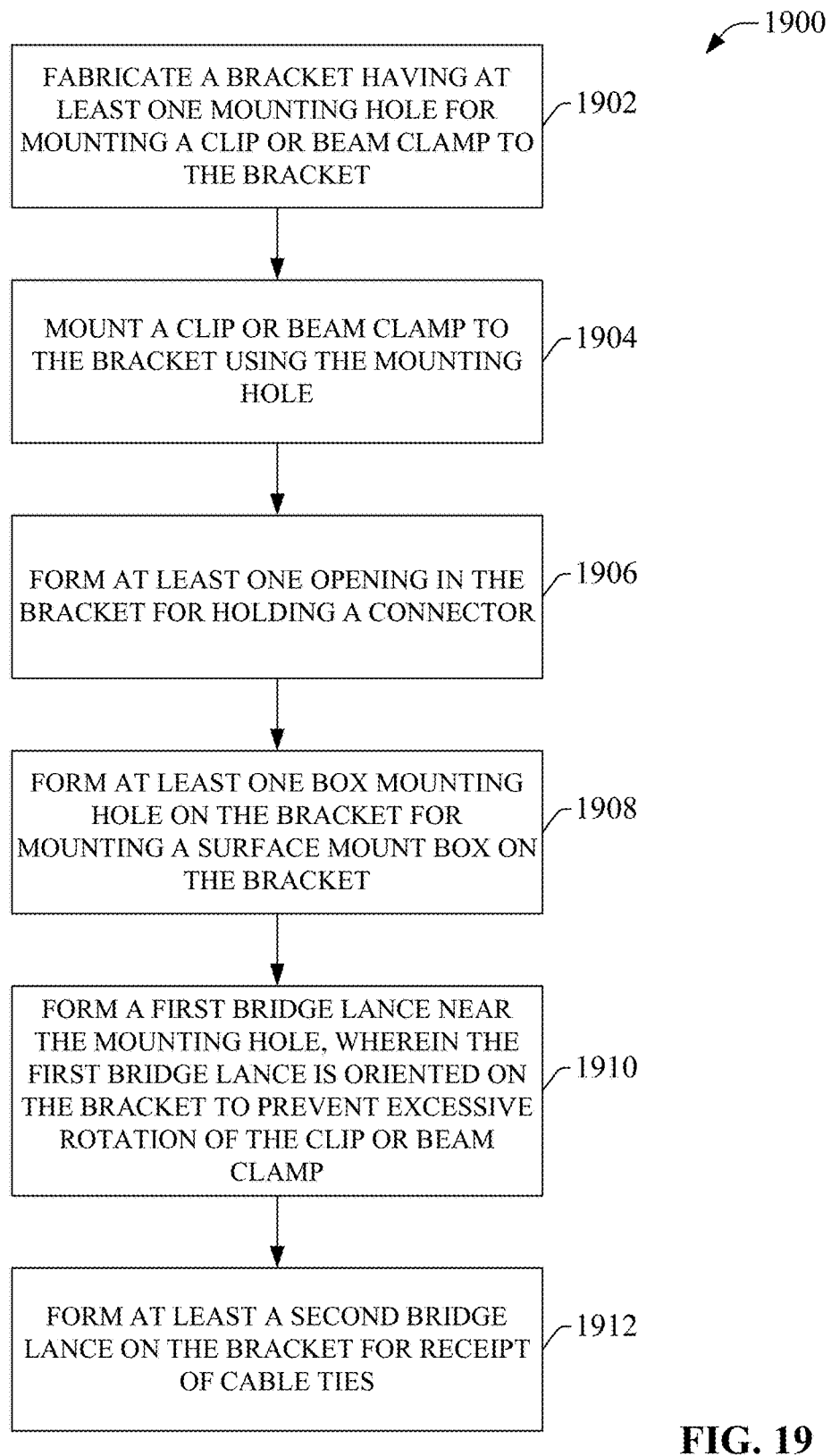
FIG. 19 is a flowchart of an example methodology for fabricating a bracket that can be used to mount a connector within a ceiling space.

FIG. 19 illustrates an example methodology 1900 for fabricating a bracket that can be used to suspend or mount a connector within a ceiling space or other building space. Initially, at 1902, a bracket is fabricated to include at least one mounting hole disposed near an edge of the bracket for mounting a clip or beam clamp to the bracket. The clip can be designed to attach to a drop wire, a threaded rod, or other rod-like structure. The beam clamp can be configured to clamp to an edge of a beam or other planar structure. At 1904, a clip or beam clamp is mounted to the bracket using the mounting hole formed at step 1902. As an alternative to steps 1902 and 1904, the bracket can be formed such that the clip or beam clamp is a continuous portion of the bracket itself (e.g., such that the clip and the bracket are formed from a common section of sheet metal or other material, or the beam clamp is an integrated, non-modular component of the bracket that cannot be separated from the bracket).

At 1906, at least one opening is formed in the bracket for holding a connector (e.g., a modular RJ-45 jack, USB port, HDMI port, VGA port, fiber optic port, etc.). At 1908, at least one box mounting hole is formed on the bracket for mounting a surface mount box on the bracket. At 1910, at least one first bridge lance is formed near the mounting hole formed at step 1902. The first bridge lance is oriented on the bracket to prevent excessive rotation of the clip or beam clamp installed using the mounting hole. At 1912, at least one second bridge lance is formed on the bracket for receipt of cable ties.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a flat bracket comprising:
   a port opening configured to receive and hold a connector,
   two mounting holes configured to mount the bracket to a surface, wherein the two mounting holes are disposed along an edge of the flat bracket near a top corner of the flat bracket and a bottom corner of the flat bracket, respectively, and
   a clip mounting hole configured to secure a clip to the flat bracket, wherein the clip is disposed along the edge of the flat bracket between the two mounting holes.
2. The system of claim 1, wherein the clip is configured to affix the flat bracket to a drop wire.

3. The system of claim 1, wherein
   the flat bracket further comprises a raised lance formed near the clip mounting hole and oriented substantially parallel with the edge, and
   the raised lance is oriented to inhibit rotation of the clip about the clip mounting hole.
4. The system of claim 2, wherein the clip comprises a bat-wing clip or a multi-function clip.
5. The system of claim 2, wherein
   the clip mounting hole is further configured to secure a beam clamp to the flat bracket, and
   the beam clamp is configured to affix the flat bracket to a planar structure.
6. The system of claim 1, wherein
   the flat bracket further comprises a box mounting hole configured to secure a surface mount box to the flat bracket, and
   the surface mount box is configured to receive and hold the connector.
7. The system of claim 6, wherein the surface mount box comprises cable port openings and is configured to hold the connector behind one of the cable port openings.
8. The system of claim 6, wherein the flat bracket comprises multiple box mounting holes, including the box mounting hole, located on the flat bracket enabling the surface mount box to be mounted in multiple orientations on the flat bracket.
9. The system of claim 1, wherein the flat bracket further comprises a raised lance configured to receive a cable tie.
10. The system of claim 1, wherein the port opening comprises a notch configured to interface with a mounting clip on the connector.
11. The system of claim 1, wherein the port opening is configured to receive and hold, as the connector, at least one of a registered jack 45 (RJ-45) jack, an RJ-11 jack, a universal serial bus (USB) port, an adapter to receive a fiber optic connector, a definition multimedia interface (HDMI) port, a video graphics array (VGA) port, a digital video interface (DVI) port, a coaxial port, a banana jack port, a Radio Corporation of America (RCA) port, a Bayonet Neill-Concelman (BNC), or a Thunderbolt port.
12. The system of claim 1, wherein the port opening comprises a notch configured to engage with a mounting clip on the connector.
13. A flat bracket, comprising:
    a port opening configured to receive and hold a connector;
    a first mounting hole located at a top corner of the flat bracket along an edge of the flat bracket;
    a second mounting hole located at a bottom corner of the flat bracket along the edge of the flat bracket; and
    a clip mounting hole located along the edge of the flat bracket between the first mounting hole and the second mounting hole,
    wherein
    the first mounting hole and the second mounting hole are configured to mount the flat bracket to a surface,
    the clip mounting hole is configured to attach a mounting device to the flat bracket.
14. The flat bracket of claim 13, wherein the mounting device is a clip configured to attach the flat bracket to a drop wire.
15. The flat bracket of claim 13, wherein the mounting device is a beam clamp configured to attach the flat bracket to a planar structure.
16. The flat bracket of claim 13, further comprising box mounting holes configured to attach a surface mount box to the flat bracket, wherein the surface mount box is configured to receive and hold the connector.

17. The flat bracket of claim 16, wherein the box mounting holes are configured to hold the surface mount box on the flat bracket in multiple orientations.

18. The flat bracket of claim 13, further comprising a raised lance formed adjacent to the clip mounting hole and oriented substantially parallel with the edge,
- wherein the raised lance is oriented to inhibit rotation of the mounting device about the clip mounting hole.

19. A flat bracket, comprising:
- means for holding a connector;
- first means for mounting the flat bracket to an external surface, wherein the first means for mounting is disposed along an edge of the flat bracket at a top corner of the flat bracket;
- second means for mounting the flat bracket to an external surface, wherein the second means for mounting is disposed along the edge of the flat bracket at a bottom corner of the flat bracket; and
- means for fastening a clip to the flat bracket, wherein the means for fastening the clip is disposed along the edge of the flat bracket between the first means for mounting and the second means for mounting.

20. The flat bracket of claim 19, wherein the clip is configured to affix the flat bracket to a drop wire.

\* \* \* \* \*